United States Patent [19]

van Heteren et al.

[11] Patent Number: 4,844,928
[45] Date of Patent: Jul. 4, 1989

[54] PROCESS FOR THE PREPARATION OF AN EDIBLE FAT-CONTAINING PRODUCT

[75] Inventors: Jan van Heteren, Vlaardingen; Janos Bodor, Rijswijk, both of Netherlands

[73] Assignee: Lever Brothers Company, New York, N.Y.

[21] Appl. No.: 843,337

[22] Filed: Mar. 24, 1986

[30] Foreign Application Priority Data

Mar. 27, 1985 [GB] United Kingdom ............. 8508011
May 24, 1985 [NL] Netherlands ............. 8501485

[51] Int. Cl.⁴ ............................................. A23D 3/00
[52] U.S. Cl. ............................................. 426/312; 426/603; 426/604; 426/613; 426/204
[58] Field of Search ............. 426/603, 604, 605, 606, 426/613, 312, 564, 601, 602

[56] References Cited

U.S. PATENT DOCUMENTS

| | | | |
|---|---|---|---|
| 2,048,286 | 7/1936 | Pease | 366/85 |
| 2,295,594 | 9/1942 | Mills | 252/134 |
| 2,525,081 | 10/1950 | Schulerud | 252/370 |
| 2,640,033 | 5/1953 | Marshall | 252/367 |
| 2,686,761 | 8/1954 | Ferguson et al. | 252/109 |
| 2,810,159 | 10/1957 | Teichmann | 425/190 |
| 2,813,302 | 11/1957 | Beck | 264/349 |
| 2,970,116 | 1/1961 | Kelly et al. | 252/368 |
| 2,973,269 | 2/1961 | Melnick | 426/603 |
| 3,089,197 | 5/1963 | Chaffee et al. | 264/50 |
| 3,174,185 | 3/1965 | Gerber | 366/99 |
| 3,434,974 | 3/1969 | Austin et al. | 252/539 |
| 3,488,199 | 1/1970 | Gander et al. | 426/603 |
| 3,523,909 | 8/1970 | Bradley et al. | 252/370 |
| 3,593,379 | 7/1971 | Hendry | 366/82 |
| 3,762,313 | 10/1973 | Schott | 100/92 |
| 3,779,521 | 12/1973 | Godines | 366/79 |
| 3,801,248 | 4/1974 | Fischer | 425/199 |
| 3,962,464 | 6/1976 | Sozzi | 426/603 X |
| 4,057,379 | 11/1977 | Sato | 425/199 |
| 4,169,901 | 10/1979 | Kravis | 426/606 X |
| 4,253,771 | 3/1981 | Renk | 366/89 |
| 4,419,014 | 12/1983 | Gale | 366/99 |
| 4,425,370 | 1/1984 | Graves | 426/603 |
| 4,439,461 | 3/1984 | Czyzewski et al. | 426/603 X |
| 4,479,884 | 10/1984 | Clarke et al. | 252/132 |
| 4,517,107 | 5/1985 | Clarke et al. | 425/204 X |
| 4,536,411 | 8/1985 | Kirton et al. | 426/603 |

FOREIGN PATENT DOCUMENTS

| | | |
|---|---|---|
| 142581 | 4/1949 | Australia ............. 426/603 |
| 0036985 | 10/1981 | European Pat. Off. . |
| 36985 | 10/1981 | European Pat. Off. . |
| 41403 | 12/1981 | European Pat. Off. . |
| 0048590 | 3/1982 | European Pat. Off. . |
| 0101104 | 2/1984 | European Pat. Off. . |

(List continued on next page.)

OTHER PUBLICATIONS

RAPTA CTM cavity transfer mixer advertising leaflet.
RAPTA News, vol. 5, No. 3, p. 5 published in Autumn 1981.
RAPTA News, vol. 6, No. 1, p. 1 and p. 5, published in Spring 1982.
Applications of the Cavity Transfer Mixer to Rubber Extrusion.
Press Release by "The International Technical Centre for Rubbers and Plastics", (ITCRP) Aug. 3, 1981.

(List continued on next page.)

Primary Examiner—Donald E. Czaja
Assistant Examiner—Celine T. Callahan
Attorney, Agent, or Firm—Matthew J. McDonald; James J. Farrell

[57] ABSTRACT

Process for the preparation of an edible fat-containing product wherein a fat-containing fraction (a) of the composition which is to constitute the product is cooled to cause crystallization of part of the fat and a fraction (b) of the composition is mixed with fraction (a) containing partially crystallized fat in a mixer comprising two closely spaced mutually displaceable surfaces, each having a pattern of cavities which overlap during movement of one surface with respect to the other, between which surfaces the fractions to be mixed pass, and according to a preferred embodiment 10 to 99.99% of fraction (a) is mixed with 90 to 0.01% of fraction (b), calculated as volume % on the total composition.

17 Claims, 4 Drawing Sheets

FOREIGN PATENT DOCUMENTS

| | | |
|---|---|---|
| 834242 | 7/1949 | Fed. Rep. of Germany . |
| 2543 | 5/1956 | Fed. Rep. of Germany . |
| 1090183 | 3/1960 | Fed. Rep. of Germany . |
| 2151891 | 4/1973 | Fed. Rep. of Germany . |
| 1135463 | 4/1957 | France . |
| 2081796 | 12/1971 | France . |
| 0016243 | 4/1974 | Japan . |
| 59-130135 | 11/1984 | Japan . |
| 8303222 | 9/1983 | PCT Int'l Appl. . |
| 727646 | 4/1955 | United Kingdom . |
| 729833 | 5/1955 | United Kingdom . |
| 787764 | 12/1957 | United Kingdom . |
| 841743 | 7/1960 | United Kingdom . |
| 843849 | 8/1960 | United Kingdom . |
| 930339 | 7/1963 | United Kingdom . |
| 935200 | 8/1963 | United Kingdom . |
| 944705 | 12/1963 | United Kingdom . |
| 723361 | 2/1965 | United Kingdom . |
| 1281628 | 7/1972 | United Kingdom . |
| 1327511 | 8/1973 | United Kingdom . |
| 1447435 | 8/1976 | United Kingdom . |
| 1475216 | 6/1977 | United Kingdom . |
| 2034742 | 6/1980 | United Kingdom . |
| 2106407 | 4/1983 | United Kingdom . |

OTHER PUBLICATIONS

Elastomerics, Oct. 1981, p. 76/8.
Press Release, ITCRP, Jan. 6, 1982.
Plastics and Rubber Weekly, No. 919, Jan. 9, 1981, p. 1.
The Oakes Continuous Automatic Mixer.
Oakes Continuous Mixer Bulletins 110, 501 and 510.
A. J. Haighton "The Measurement of the Hardness of Margarine and Fats with Core Penetrometers", JAOCS 36, (1959), 345–348.
A. J. C. Anderson, "Margarine", Pergamon Press Limited, London 1954, pp. 228–232.
J. C. van den Enden et al., "A Method for the Determination of the Solid Phase Content of Fats Using Pulse Nuclear Magnetic Resonance", Fette, Seifen, Anstrichmittel 80, (1978), 180–186.
Kirk–Othmer Encyclopedia of Chemical Technology, Second Edition, vol. 18, pp. 426–429, 432.
Buerger et al. in Proc. N.A.S., 31 (1945), pp. 226–233.
Ferguson, R. H., "Oil & Soap", Jan. 1944, pp. 6 to 9.
Ferguson, R. H. et al., "Industrial and Engineering Chemistry", 35, No. 9 (1943), pp. 1005–1012.
Bailey's Industrial Oil & Fat Products, vol. 1, 4th Ed., John Wiley & Sons, pp. 523–526.

PROCESS FOR THE PREPARATION OF AN EDIBLE FAT-CONTAINING PRODUCT

FIELD OF THE INVENTION

The present application is concerned with a process for the preparation of an edible fat-containing product.

PRIOR ART

In the preparation of edible fat-containing products, such as e.g. margarine, shortening and low calorie spreads, it is common practice to mix all ingredients and then subject the mixture to cooling and working operations in a series of one or more scraped-surface heat exchangers and agitated crystallizers, e.g. as described in A. J. C. Anderson, Margarine, Pergamon Press Limited, London, 1954, pages 228–229.

Other processes have, however, also been described.

A. J. C. Anderson, cited above, has described on pages 230–231 a process for preparing margarine wherein the fat blend and 25% of the milk are passed through two scraped-surface heat exchangers and the remainder of the milk is chilled and then injected under pressure into the semi-liquid material leaving the scraped-surface heat exchangers. The mixture is then passed through a blender, provided with rod-shaped beaters, which rotate at 700 r.p.m. and disperse the milk in the margarine.

In JP No. 59 130 135 a process is described for the preparation of an edible fat product containing both butterfat and other fat by first separately preparing butter and margarine, heating the butter to 10°–23° C. and mixing the butter with the margarine in a static mixer.

From European patent application No. 101,104, it is known to prepare an edible oil and water-containing emulsion comprising inter alia processing an oil-in-water emulsion and a separate water phase followed by mixing these phases to obtain the final emulsion.

British Pat. No. 1,327,511 describes mixing and emulsifying two separate process streams, one warm liquid containing crystallizable fat and a second, cold liquid containing substantially no crystallizable fat, followed by working and packing of the partially crystallized mixture.

GENERAL DESCRIPTION

The present invention provides a process for the preparation of an edible fat-containing product wherein a fat-containing fraction (a) of the composition which is to constitute the product is cooled to cause crystallization of part of the fat and a fraction (b) of the composition is mixed with fraction (a) containing partially crystallized fat in a mixer comprising two closely spaced, mutually displaceable surfaces, each having a pattern of cavities which overlap during movement of one surface with respect to the other, between which surfaces the fractions to be mixed pass.

An essential aspect of the present invention is that it provides a process in which a part of the composition can be plastified and subsequently mixed with the remainder of the composition such that a sufficient degree of mixing can be achieved without subjecting the mixture to such severe working conditions that the structure imparted to the plastified part of the composition is destroyed to a large extent during the mixing. Because of this, improved products can be obtained by the present process.

Another advantage of the process is that a sufficient degree of mixing, while maintaining the microstructure of the plastified fraction, can be obtained at relatively low pressure in the production line.

The mixer used in the present process comprises two closely spaced, mutually displaceable surfaces, each having a pattern of cavities which overlap during movement of one surface with respect to the other. The material moving between the surfaces traces a path through cavities alternately in each surface.

Preferably, the surfaces of the mixer have patterns of cavities such that a cavity on one of the surfaces continuously overlaps with at least two cavities on the other surface. In the preferred mixer for this process, the cavities are arranged to give constantly available but changing pathways through the device during movement of one surface with respect to the other.

Suitably, the mixer has a cylindrical geometry.

Preferably, the mixer comprises a stator and a rotor; the opposing faces of the stator and rotor carry the cavities through which the material passes during its passage through the device. The external cylinder may be rotatable while the internal cylinder is fixed, but preferably the external cylinder is the stator within which the rotor is journalled.

The mixer may also have a planar geometry in which opposed plane surfaces having patterns of cavities would be moved mutually. Another geometry that can be used is a cone geometry. A mixer of such geometry can comprise a rotor and a stator having shapes of truncated cones. An advantage of a planar or cone geometry is that the distance between the two surfaces can be varied easily. Other geometries can also be suitable, but mixers having a cylindrical geometry are preferred. The rotor may be located eccentrically, but preferably it is placed centrically.

Various configurations can be used for the shape of the cavities. The cavities can, for example, be hemispherical or they can have the shape of a flattened hemisphere. Other shapes that can be used are, for example, half ellipsoids or cylinders having hemispherical closed ends or flattened varieties thereof.

In the International application, publication No. WO 83/03222, a device is described having a geometry of the above kind. In the publication it is mentioned that this device can be used for operations on margarines.

It is essential in the present process that fraction (a) of the composition has been cooled such that part of the fat present in this fraction has been crystallized and is present in the solid phase when it enters the mixer to be mixed with fraction (b). Fraction (a) can suitably be cooled, for example by passing it through one or more scraped-surface heat exchangers.

The composition used in the present process preferably comprises at least 10% by weight of fat, the balance consisting essentially of material selected from the group consisting of water, protein, gas, emulsifiers, gelling and thickening agents, salt, flavour compounds, colouring matter and mixtures of two or more thereof. Other ingredients, e.g. preservatives, may, however, also be present in small amounts.

Fraction (a) necessarily contains fat. Apart from this requirement, the compositions of fractions (a) and (b) and the ratios in which they can be mixed can be chosen in a variety of ways, as will be described below.

In this application, by fat is meant, unless indicated otherwise, an edible substance, which may be solid or liquid at ambient temperature, consisting essentially of triglycerides such as, for example, soybean oil, sunflower oil, palm oil, coconut oil, fish oil, lard and tallow, which may have been partially or completely hydrogenated or modified otherwise, or comprising non-toxic material having physical properties similar to triglycerides, which material may be indigestible, such as for example waxes, e.g. jojoba oil and hydrogenated jojoba oil, and poly fatty acid esters of mono- and disaccharides, e.g. sucrose octa fatty acid ester, or mixtures thereof.

The mixture leaving the mixer preferably is a dispersed system having a continuous fat phase containing crystallized fat. The mixture leaving the mixer can be packed immediately, e.g. by filling in tubs, or it can be subjected to further processing before packing it. Products that can thus be obtained are, for example, shortening, butter, margarines, low calorie spreads and melanges. By a low calorie spread is meant a product similar to butter or margarine, a product having a continuous fat phase and a dispersed aqueous phase and containing crystallized fat, but containing less than about 80% by weight of fat. By a melange is meant a product having a continuous fat phase and a dispersed aqueous phase and containing crystallized fat, wherein the fat comprises both butterfat and other fat.

In the present process, preferably 10-99.99% fraction (a) is mixed with 90-0.01% fraction (b), calculated as volume % on the total composition. Fraction (a) preferably comprises at least 20% by weight of fat. The amount of crystallized fat in fraction (a), when entering the mixer, is preferably at least 2%, more preferably from 5 to 60% by weight, calculated on the total amount of fat in fraction (a).

In a preferred embodiment of the present invention, fraction (a) comprises at least 20% by weight of fat, fraction (b) comprises at least 5% by weight of water and 10-90% fraction (a) is mixed with 90-10% fraction (b), calculated as volume % on the total composition. Preferably, fraction (b) comprises 1 to 30% by weight of protein. It is also preferred that fraction (b) comprises from 10 to 85% by weight of fat.

According to a preferred aspect of this embodiment, fraction (a) comprises at least 80% by weight of fat, fraction (b) is an aqueous solution or a dispersed system having a continuous aqueous phase and comprises at least 30% by weight of water and 15-90% fraction (a) is mixed with 85-10% fraction (b), calculated as volume % on the total composition. For example, the present process is particularly suitable for preparing low calorie spreads, fraction (a) consisting mainly of fat and optionally containing other fat-soluble ingredients, such as emulsifiers and flavours, and fraction (b) providing the aqueous phase. The aqueous phase may contain gelling agents such as gelatin or guar gum and other water-soluble ingredients. Particularly when fraction (b) comprises a substantial amount of protein, e.g. milk protein, e.g. in the form of yoghurt or curd, excellent low calorie spreads can be prepared in this manner.

A further advantage of preparing low calorie spreads in this manner is that the risk of formation of an oil-in-water emulsion instead of a water-in-oil emulsion is substantially reduced as compared to conventional processes. This is important because, especially in the preparation of very low fat spreads, containing e.g. less than 40% fat, it is a major problem to prevent phase inversion from occurring during the processing, which would result in a product having a continuous aqueous phase.

To prepare low calorie spreads according to this aspect of the invention, preferably fraction (a) consists essentially of fat, fraction (b) comprises at least 40% by weight of water and at most 50% by weight of fat and 15-60% fraction (a) is mixed with 85-40% fraction (b), calculated as volume % on the total composition.

Excellent products can be prepared if a cream comprising from 10 to 50% by weight of fat is used as fraction (b). Natural dairy cream can be used, but constituted creams, e.g. comprising vegetable fat, can also be used. Products thus prepared can have an improved texture, making a more creamy impression. This is probably caused by the partial retention of the structure of the cream in the final product such that the product is a double emulsion of the oil-in-water-in-oil type.

Products such as margarine can be prepared by increasing the amount of fraction (a) that is used relative to the amount of fraction (b) and/or increasing the amount of fat in fraction (b). Products thus prepared can have improved properties as compared with products having the same composition but prepared in a conventional manner.

According to another preferred aspect of this embodiment, the present invention provides a process wherein fraction (a) comprises from 20 to 90% by weight fat, fraction (b) comprises from 10 to 90% by weight fat, each of fractions (a) and (b) comprises from 5 to 80% by weight of water, from 0 to 20% by weight of protein and from 0 to 20% by weight of other ingredients, and wherein both fraction (a) and fraction (b), when entering the mixer, have continuous fat phases. The protein content and the amount of other ingredients in each of the fractions are preferably at least 0.05% by weight and 0.28% by weight, respectively. Preferably, both fraction (a) and fraction (b) comprise crystallized fat when entering the mixer. The amount of crystallized fat in each of the fractions preferably is at least 2%, more preferably 5-40% by weight of the total amount of fat in the fraction.

It is particularly preferred that each of fractions (a) and (b), when entering the mixer, is margarine or butter or a low calorie spread.

According to this aspect, for example margarine and butter can be prepared separately and then, optionally after storage, be mixed to provide a melange. Similarly, melanges can be prepared by mixing butter or a butterfat-containing low calorie spread with a low calorie spread containing fats other than butterfat. By mixing, for example, margarine with a low fat spread having a high protein content, excellent products can be prepared containing e.g. 60% fat.

According to this aspect, substantially improved products can be obtained, because microstructural elements of each of the two fractions can be preserved during the mixing.

When using other mixers, usually either an insufficient degree of mixing of the two products is obtained or the working conditions are so severe and/or the amount of heat dissipated so high that the microstructural elements of the separately prepared fractions are lost, so that all ingredients might as well have been mixed before the plastification. Another advantage is that the mixing can be achieved at relatively low pressure, even when mixing fractions as hard as butter.

Particularly satisfactory products can be produced according to this aspect of the invention if churned butter or a low calorie churned butterfat-containing product is used as fraction (a) or (b).

According to another preferred embodiment, the present invention provides a process wherein fraction (b) comprises a flavour compound, a precursor of such a compound or a microbial culture which produces a flavour compound or a precursor thereof. Preferably 90–99.99% fraction (a) is mixed with 10–0.01% fraction (b), calculated as volume % on the total composition.

For various reasons, it may be desirable to introduce minor components such as flavour compounds into the composition after plastification thereof. For example, some flavour compounds deposit in liquid oil, and it is therefore virtually impossible to get a homogeneous distribution in the product if such compounds are added in a premix vessel before plastification of the product. Moreover, such materials may deposit in the production line, which can cause contamination of the equipment. Such deposited material might then be incorporated in products which are subsequently produced with the same equipment. To prevent this from happening, additional cleaning would be required. With the present process, such compounds can be incorporated homogeneously without problems. Another advantage of the present process is that the risks of loss of flavour can be substantially reduced.

Another example of particularly suitable application of this process is the preparation of butter. In this application, fraction (a), when entering the mixer, is sweet butter and fraction (b) comprises a microbial culture which produces a flavour compound or a precursor thereof and an edible acid. In this manner, high quality butter can be prepared and the buttermilk obtained is sweet instead of sour.

Fraction (b) in this embodiment may comprise the minor components to be mixed in as such, but, preferably, fraction (b) is a dispersion or a solution of the minor components in water or fat.

According to yet another preferred embodiment, fraction (b) comprises gas.

The incorporation of gas can often improve the quality of a product; for example, its appearance can be improved.

It is common practice to introduce the gas into the composition before plastifying it. With such a process it can be very difficult to obtain a proper distribution of gas bubbles, owing to uncontrolled expansion of the gas present in the composition after pressure has been released. Such an improper distribution of the gas adversely affects the quality of the product. With the present process, this problem can be overcome and gas can be homogeneously distributed in the product at relatively low pressure without substantially destroying the structure which has already been imparted to the remainder of the composition.

Fraction (b) can be gas as such, e.g. nitrogen or air, but preferably fraction (b) is a dispersion containing gas, e.g. gas dispersed in a small amount of oil.

Preferably, 40–98% fraction (a) is mixed with 60–2% fraction (b), calculated as volume % on the total composition.

According to this process, products with a wide range of gas contents can be prepared. The gas content of the final product can be as low as 1 or 2 vol. % or as high as e.g. 50–60 vol. %.

Preferably, fraction (a) comprises from 60 to 100% by weight of fat. The process is particularly suitable for preparing gas-containing products such as shortenings.

BRIEF DESCRIPTION OF THE DRAWINGS

Suitable mixers which can be used in the present process will be described with reference to the accompanying diagrammatic drawings in which.

SPECIFIC DESCRIPTION OF THE DEVICES

Figure 1:
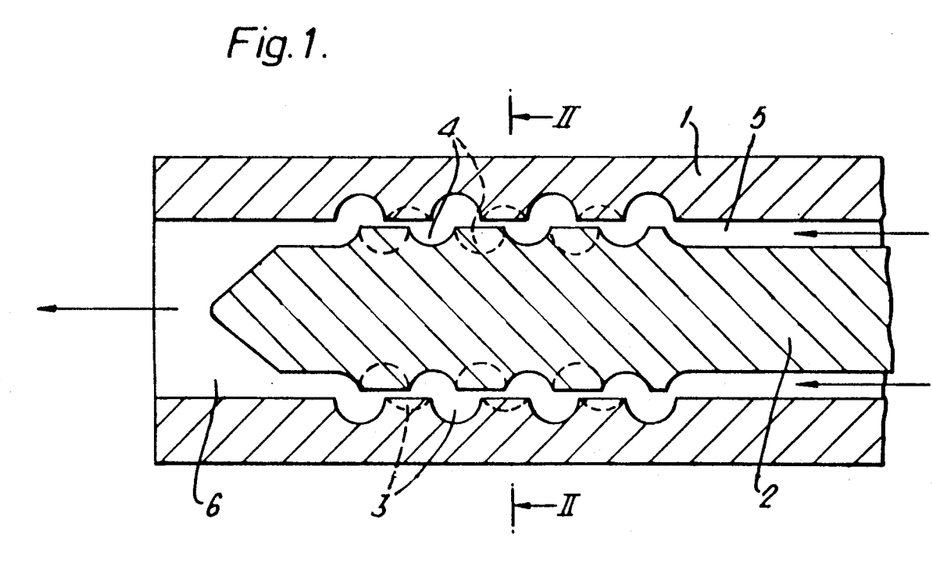
FIG. 1 is a longitudinal section of a mixer with cylindrical geometry.

In FIG. 1 is shown a mixer in longitudinal section. This comprises a hollow cylindrical stator member 1, a cylindrical rotor member 2 journalled for rotation within the stator with a sliding fit, the facing cylindrical surfaces of the rotor and stator carrying respective pluralities of parallel, circumferentially extending rows of cavities which are disposed with:

(a) the cavities in adjacent rows on the stator circumferentially offset;

(b) the cavities in adjacent rows on the rotor circumferentially offset; and (c) the rows of cavities on the stator and rotor axially offset.

Figure 2:
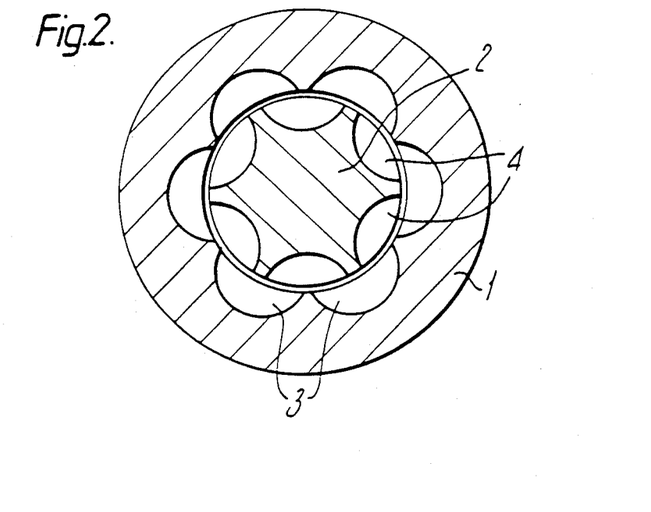
FIG. 2 is a transverse section along the line II—II on FIG. 1.
Figure 3:
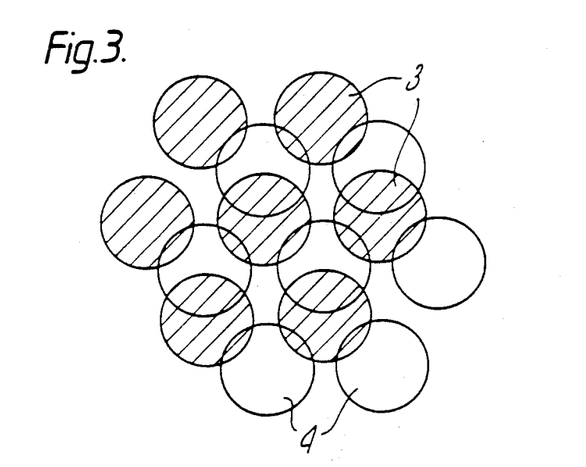
FIG. 3 illustrates the pattern of cavities in the device of FIG. 1.

The pattern of cavities carried on the stator 3 and rotor 4 is illustrated in FIG. 3. The cavities 3 on the stator are shown hatched. The overlap between patterns of cavities 3, 4 is also shown in FIG. 2.

The material passing through the device moves through the cavities alternately on the opposing faces of the stator and rotor. The cavities immediately behind those shown in section are indicated by dotted profiles on FIG. 1 to allow the repeating pattern to be seen.

The material flow is divided between pairs of adjacent cavities on the same rotor or stator face because of the overlapping position of the cavity on the opposite stator or rotor face.

The mixer can, for example, have a rotor radius of 2.5 cm with 36 hemispherical cavities (radius 0.9 cm) arranged in six rows of six cavities. The internal surface of the stator can carry e.g. seven rows of six cavities to provide cavity overlap at the entry and exit. The material to be mixed is injected into the device through channel 5, which communicates with the annular space between the rotor and stator. The material leaves the device through exit 6.

Figure 4:
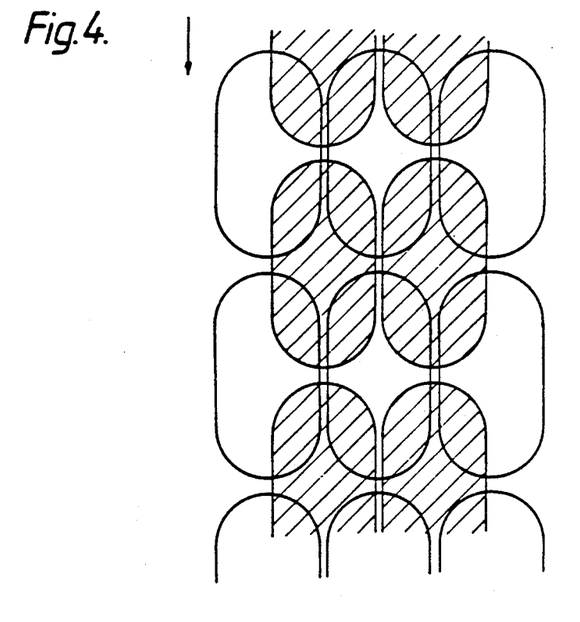
FIGS. 4, 5 and 6 illustrate other patterns of cavities.

FIG. 4 shows elongate cavities arranged in a square pattern; these cavities have the sectional profile of FIG. 2. These cavities are aligned with their longitudinal axis parallel to the longitudinal axis of the device and the direction of movement of material through the device; the latter is indicated by the arrow.

Figure 5:
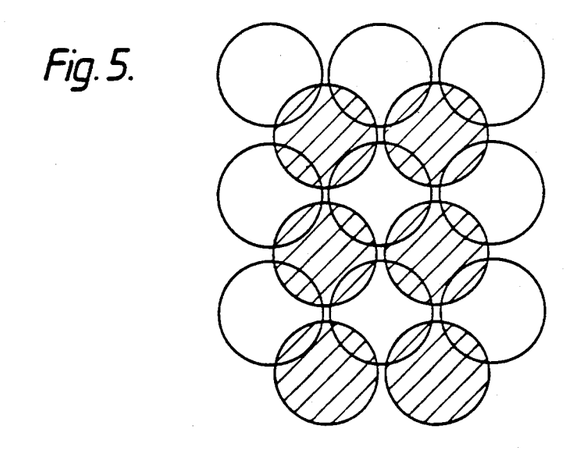

FIG. 5 shows a pattern of cavities having the dimensions and profile of those shown in FIGS. 1, 2 and 3. The cavities of FIG. 5 are arranged in a square pattern with each cavity being closely spaced from flow adjacent cavities on the same surface. This pattern does not provide as high a degree of overlap as given by the pattern of FIG. 3. The latter has each cavity closely spaced to six cavities on the same surface, in a hexagonal pattern.

Figure 6:
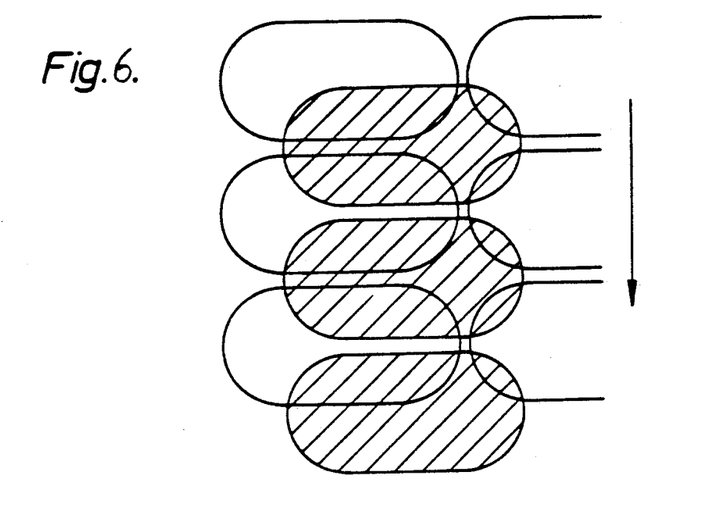

FIG. 6 shows a pattern of cavities wherein the cavities on the rotor, shown hatched, and stator have a larger dimension normal to the material flow; the latter is indicated by an arrow. The cavities are thus elongate. This embodiment can provide a lower pressure drop over its length compared with devices of similar geometry but not having cavities positioned with a longer dimension normal, i.e. perpendicular to the material flow. To obtain a reduction in pressure drop, at least one of the surface must carry elongate cavities having their longer dimension normal to the material flow.

EXAMPLES

Example 1

A protein-containing low calorie spread was prepared as follows:

The fat phase was prepared by mixing
  20 wt. % soybean oil
  19 wt. % rapeseed oil
  10 wt. % palm oil
  23 wt. % soybean oil hydrogenated to a slip melting point of 36° C.
  26,75 wt. % fish oil hydrogenated to a slip melting point of 35° C.
  1 wt. % emulsifiers
  0.25 wt. % colouring matter.

The aqueous phase was prepared by mixing
  84 wt. % water
  14 wt. % sodium caseinate
  1.5 wt. % salt
  0.5 wt. % other ingredients.

The fat phase was heated to 45° C. and plastified at a capacity of 2 kg/h by passing it through a scraped-surface heat exchanger of the Votator type (A-unit), subsequently passing it through an agitated crystallizer of the Votator type (C-unit) and passing it through another A-unit, The pressure at the beginning of the line was 14 bar absolute. The plastified fat phase leaving the second A-unit had a temperature of 10° C. and contained 27% by weight of crystallized fat.

The aqueous phase was cooled down from 45° C. to 9° C. by passing it through an A-unit at a capacity of 3 kg/h.

The product streams of plastified fat and cooled aqueous phase were both passed into a mixer of the type shown in FIG. 1, at a total capacity of 5 kg/h. The density of the plastified fat phase was about 0.9 g/ml, that of the aqueous phase was about 1 g/ml. The pressure drop across the mixer was about 2 bar.

The product leaving the device was filled into tubs. Its temperature was 13.5° C.

The diameters of the stator and rotor of the mixer were 28 mm and 27.7 mm, respectively, providing an annulus of 0.15 mm. The number of cavities on the stator was 36 and on the rotor 42. Each cavity had a diameter of 12 mm and a depth of 4 mm. The volume of the mixer was 50 ml. The rotor speed was 200 rpm.

A good quality product was obtained having hardness values (C-values) at 10°, 15° and 20° C. of 1230, 650 and 220 g/cm$^2$, respectively. The hardness of the product was measured with a cone penetrometer as described in J.A.O.C.S. 36 (1959), 345–348. The product had a homogeneous droplet dispersion.

Similar results were obtained when the rotor speed of the mixer was 1000 rpm instead of 200 rpm.

Example 2

Example 1 was repeated using an aqueous phase having the following composition:
  99.7 wt. % water
  0.2 wt. % salt
  0.1 wt. % potassium sorbate.

A proper low calorie spread was obtained.

Example 3

A product having an oil-in-water-in-oil structure was prepared by using a fat blend as fraction (a) and a cream as fraction (b).

Fraction (a) was prepared by mixing the following ingredients:
  55 wt. % rapeseed oil
  5 wt. % palm oil
  22 wt. % hydrogenated fish oil (smp 37° C.)
  18 wt. % hydrogenated soyabean oil (smp 36° C.)
  0.3 wt. % emulsifiers
  0.2 wt. % colouring matter.

A cream was prepared from the following ingredients:
  40 wt. % water
  53 wt. % sunflower oil
  3 wt. % soured skimmed milk
  2.3 wt. % milk protein
  0.5 wt. % salt
  0.5 wt. % gelatin
  0.5 wt. % preservatives The fat blend was heated to 45° C. and plastified by passing it through an A-unit, a C-unit and an A-unit as described in Example 1, at a capacity of 2.2 kg/h. The plastified fat blend leaving the second A-unit had a temperature of 5° C. and a solids content of 15% by weight. The pressure before the first A-unit was 14 bar absolute.

The cream was cooled to 10° C. and 1 kg/h of cream was passed together with the stream of plastified fat through a mixer as described in Example 1. The relative amounts in which the fat and the cream were mixed were about 69 volume % fat and about 31 volume % cream. The pressure drop across the mixer was 0.5 bar. The product leaving the mixing device was packed.

An excellent product with a homogeneous droplet dispersion was obtained, which made a very creamy impression. This was in agreement with analysis of the product which showed that it contained 31.6% internal phase. Thus, essentially all oil contained in the cream was retained inside the aqueous droplets in the end product.

The oral melt properties of the product were satisfactory: the salt release (T 100=temperature at which the emulsion is completely destabilized) was 37.6° C.

The example was repeated using a rotor speed of the mixer of 1000 rpm. The product obtained comprised 28% internal phase. It has a T 100 salt release value of 37.6° C.

Example 4

A product was prepared by using both as fraction (a) and as fraction (b) a plastified product having a water-in-oil structure and containing crystallized fat.

Fraction (a) had the following composition:
  35 wt. % palm oil
  10 wt. % soybean oil
  23 wt. % rapeseed oil
  16 wt. % hydrogenated soybean oil (smp 36° C.)

16 wt. % water
0.3 wt. % emulsifiers.

Fraction (b) contained the same ingredients as fraction (a) and further contained 0.2% by weight of a solution of 0.4% by weight of β-carotene in oil as colouring agent.

Margarine was prepared from fraction (a) in a conventional manner, at a capacity of 27 kg/h.

Fraction (b) was plastified in the same way as fraction (a).

Subsequently, 50% fraction (a) and 50% fraction (b), calculated as volume % of the total composition, were led into a mixer as described in Example 1, at a total capacity of 54 kg/h. When entering the mixer, fractions (a) and (b) contained 8% crystallized fat, calculated as % by weight on the total amount of fat of each fraction. The rotor speed of the mixer was 100 rpm. The product leaving the mixer was packed.

The example was repeated once with a rotor speed of 200 rpm and once with a fixed rotor (rotor speed 0 rpm). The example was repeated at rotor speeds of 0, 100 and 200 rpm using a total capacity of 38 kg/h (19 kg/h of each of fraction (a) and fraction (b)).

Some properties of the products obtained, determined 15 minutes after production, are shown in Table I.

TABLE I

| total capacity (kg/h) | 54 | 54 | 54 | 38 | 38 | 38 |
|---|---|---|---|---|---|---|
| rotor speed (rpm) | 0 | 100 | 200 | 0 | 100 | 200 |
| temperature (°C.) | 15 | 16 | 16 | 17 | 15 | 16 |
| solids content (wt. %) | 12 | 17 | 14 | 18 | 18 | 13 |
| hardness (g/cm$^2$) | 1400 | 1150 | 1300 | 2000 | 1400 | 1500 |
| colour* | 2 | 1 | 1 | 2 | 1 | 1 |

*colour:
1 indicates a product having a homogeneous colour
2 indicates a product having a non-homogeneous colour The results in the table show that at a rotor speed of 0 rpm, i.e. when using the device as a sort of static mixer, a product is obtained which has a nonhomogeneous colour. The experiments carried out at rotor speeds of 100 rpm or 200 rpm show that, even when using fractions (a) and (b) that have both been plastified, a sufficient degree of mixing can be obtained with a rather small mixer, used at a high capacity.

Example 5

A product containing 50 volume % of air was prepared from a fraction (a) containing the non-gaseous ingredients and a fraction (b) consisting of air.

Fraction (a) was prepared from the following ingredients:

84 wt. % of the fat blend described in Example 1
11 wt. % water
5 wt. % soured skimmed milk
0.1 wt. % colouring matter
0.1 wt. % salt
0.1 wt. % potassium sorbate.

Fraction (a) was homogenized at 44° C. in a premix vessel. The mixture was then passed at a capacity of 2.1 kg/h through an A-unit, a C-unit and another A-unit. The mixture left the second A-unit at a temperature of 7.5° C. It was a water-in-oil emulsion which contained 23% of crystallized fat, calculated as weight % on the total amount of fat.

50 volume % fraction (a) leaving the second A-unit was fed with 50 volume of air into a mixer as described in Example 1. The mixer was operated on an overall capacity of 2.1 kg/h and a rotor speed of 800 rpm. The pressure drop across the mixer was 1 bar.

The product leaving the mixer was packed. It left the mixing device at a temperature of 19.5° C. and it contained 12.2% crystallized fat, calculated as % by weight on the total product.

The hardness of the product at 5°, 10° and 15° C. was 2050, 1800 and 1030 g/cm$^2$, respectively. The gas was dispersed very homogeneously throughout the product. The appearance of the product was excellent; it had a pale, mat surface. The Yellowness Index was 31, the Gloss (Intensity of light reflected by the surface of a beam illuminating the surface under an angle of 60° C., expressed as % of the intensity of the illuminating light beam) was 9.5.

Examples 6 and 7

Two melanges were prepared from fat blends containing respectively 25 and 50 wt. % of butter, and respectively 75 and 50 wt. % of margarine, but separately feeding the two products to a mixer as described in Example 1. The rotor speed was 750 rpm, and the feed temperature of both feed streams was 8° C. The solid fat content of the butter was 52 wt. % and of the margarine was 47 wt. %. The temperature of the products leaving the mixer was 9° C. The product characteristics are given in the table.

TABLE

| Example | 6 | 7 |
|---|---|---|
| wt. % butter | 25 | 50 |
| C10 | 1100 | 1300 |
| C20 | 90 | 60 |

The products obtained could be spread very good, and had better properties than each of the starting products as such.

We claim:

1. Process for the preparation of an edible fat-containing product formed from two fractions of ingredients which comprises:
   (i) cooling a first fraction (a) of ingredients comprising at least 20% by weight of fat to cause crystallization of from 5 to 60% by weight of the fat therein, wherein the balance of the first fraction (a) comprises material selected from the group consisting of water, protein, gas, and mixtures thereof,
   (ii) mixing with said first fraction (a) a second fraction (b) comprising material selected from the group consisting of fat, water, protein, gas and mixtures thereof,
wherein from 10 to 99.99% of said first fraction (a) is mixed with from 90 to 0.01% of said second fraction (b) calculated as volume % of the total product, said mixing being carried out in a mixer comprising two closely spaced mutually displaceable surfaces, each having a pattern of cavities which overlap during movement of one surface with respect to the other, between which surfaces the fractions to be mixed pass, so as to produce said product while retaining substantially the microstructure of the crystallized fat.

2. Process according to claim 1 wherein the product comprises at least 10% by weight fat and additionally comprises material selected from the group consisting of emulsifiers, gelling and thickening agents, salt, flavor compounds, coloring matter, and mixtures thereof.

3. Process according to claim 1 wherein a cavity on one of the surfaces continuously overlaps with at least two cavities on the other surface.

4. Process according to claim 1, wherein the surfaces are rotor and stator surfaces.

5. Process according to claim 1 wherein the product leaving the mixer is a dispersion having a continuous fat phase and containing crystallized fat.

6. Process according to claim 1, wherein fraction (b) comprises at least 5% by weight of water and 10-90% fraction (a) is mixed with 90-10% fraction (b), calculated as volume % on the total composition.

7. Process according to claim 6, wherein fraction (b) comprises from 1 to 30% by weight of protein.

8. Process according to claim 6, wherein fraction (b) comprises from 10 to 85% by weight of fat.

9. Process according to claim 6 wherein fraction (a) comprises at least 80% by weight fat, fraction (b) is an aqueous solution or a dispersion having a continuous aqueous phase and comprises at least 20% by weight water, and 15-90% fraction (a) is mixed with 85-10% fraction (b), calculated as volume % on the total composition.

10. Process according to claim 9, wherein fraction (a) consists essentially of fat, fraction (b) comprises at least 40% by weight water and at most 50% by weight fat, and 15-60% fraction (a) is mixed with 85-40% fraction (b), calculated as volume % on the total composition.

11. Process according to claim 6, wherein fraction (a) comprises from 20 to 90% by weight of fat, fraction (b) comprises from 10 to 90% by weight of fat, each of fractions (a) and (b) comprises from 5 to 80% by weight of water, from 0 to 20% by weight of protein and from 0 to 20% by weight of further ingredients selected from group consisting of gas, emulsifiers, gelling and thickening agents, salt, flavor compounds, coloring matter, and mixtures thereof, and wherein both fractions (a) and (b), when entering the mixer, have continuous fat phases.

12. Process according to claim 11, wherein fraction (b) comprises crystallized fat when entering the mixer.

13. Process according to claim 12, wherein each of fractions (a) and (b) comprises from 5 to 40% by weight of crystallized fat, calculated on the total amount of fat in each fraction.

14. Process according to claim 11, wherein each of fractions (a) and (b), when entering the mixer, is selected from the group consisting of margarine, butter and a low calorie spread.

15. Process according to claim 14, wherein one of the fractions comprises butter and the other comprises margarine.

16. Process according to claim 1, wherein fraction (b) comprises gas.

17. Process according to claim 16, wherein 40-98% fraction (a) is mixed with 60-2% fraction (b), calculated as volume % on the total product.

* * * * *